Figure 1:
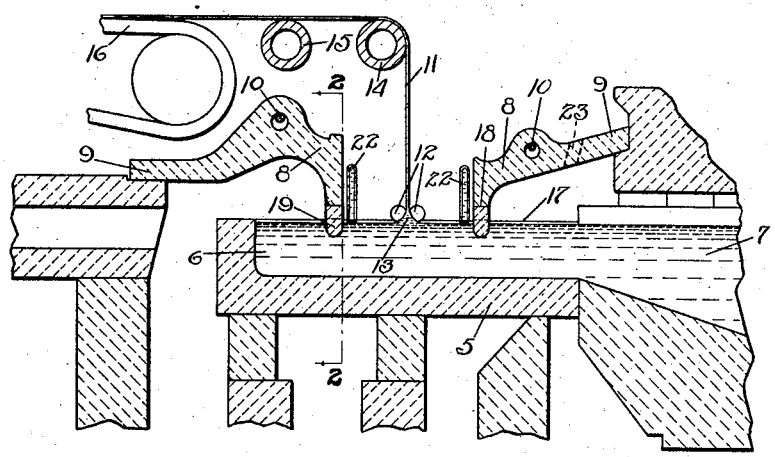

Sept. 6, 1927.

N. MAMBOURG 1,641,894

SHEET DRAWING APPARATUS

Filed Oct. 13, 1924

INVENTOR.
Nestor Mambourg
By Frank Frauer
ATTORNEY.

Patented Sept. 6, 1927.

1,641,894

UNITED STATES PATENT OFFICE.

NESTOR MAMBOURG, OF LANCASTER, OHIO, ASSIGNOR TO THE LIBBEY-OWENS SHEET GLASS COMPANY, OF TOLEDO, OHIO, A CORPORATION OF OHIO.

SHEET-DRAWING APPARATUS.

Application filed October 13, 1924. Serial No. 743,233.

The present invention relates to sheet glass drawing apparatus, and has particular reference to a partition for use in connection therewith.

In the Colburn process disclosed in Colburn Patent 1,248,809, granted December 4, 1917, a sheet of glass is drawn vertically from a source of molten glass and is passed over a bending roll into a horizontal plane over a flattening table and through an annealing lehr. Disposed above the source of molten glass is a pair of lip-tiles which are arranged to deflect heat currents present around the machine downwardly toward the surface of the glass. Arranged between the lip-tiles and the sheet being drawn are so-called sheet coolers which tend to cool the surface of the sheet and also to protect the sheet against the said heat currents.

An important object of this invention is to provide a member formed from a refractory material between the lower extremity of the lip-tiles and the source of molten glass to shield the sheet being drawn from the hot air currents present around the machine to prevent the sheet from breaking down after it has once left the drawing pot.

A further object of the invention is to provide a member of this nature between the lower extremity of the lip-tile and having a portion extending down below the surface of the molten glass from which the sheet is drawn so that the sheet will be drawn from glass under the surface of the source, thus allowing a greater production.

A still further object of the invention is to provide a member of this nature that can be used with the present form of machine used in the Colburn process without in any way necessitating a change of the arrangement therein.

Other objects and advantages of the invention will become apparent during the course of the following description.

In the drawings wherein like numerals are employed to designate like parts throughout the same.

Figure 2:
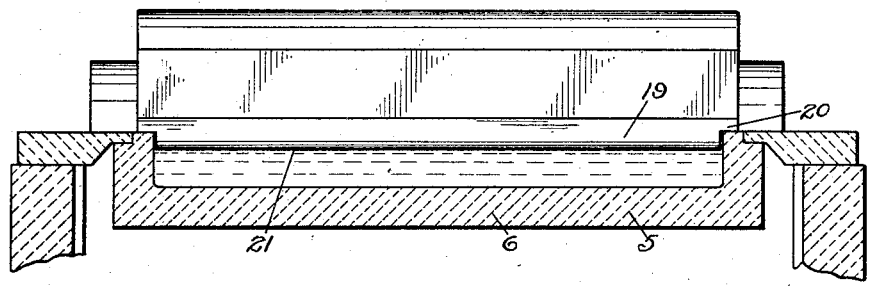

Fig. 1 is a fragmentary longitudinal section of a portion of the drawing apparatus showing my invention in section, and Fig. 2 is a section taken on line 2—2 of Fig. 1, and looking in the direction of the arrows.

In the drawings wherein for the purpose of illustration is shown the preferred embodiment of the invention, the numeral 5 designates a draw-pot in which is a bath of molten glass 6 which is supplied from a source 7. Arranged above the pot 5 and out of contact with the bath of glass 6 are a pair of lip-tiles 8 which are supported at one end as at 9 and are hung upon suitable supports 10, as clearly shown in Fig. 1. The sheet 11 is initially started from the pot 5 by means of a bait, after which the operation is continuous. To maintain the desired width, pairs of rollers 12 are disposed at opposite edges of the drawn sheet and arranged preferably at the meniscus 13. The sheet 11 is bent over a bending roll 14, passes over an idler roll 15, and through a flattening table 16. It will be seen that the lip-tiles are slightly arched to lap the heat currents present in and around the machine downwardly toward the surface 17 of the molten bath 6 so as to prevent a breakdown of the sheet 11 during its vertical and horizontal runs. However, as there is a space between the lower end 18 of the lip-tile and the surface 17 of the bath of molten glass without necessary precautions, the heat currents will be free to pass therebetween and strike the sheet.

In accordance with the present invention a member 19 is formed from a suitable refactory material and is provided with the lips 20 to permit its support upon the pot 5 at opposite sides thereof. As is clearly shown in Fig. 2, the member 19 rests upon the sides of the pot 5 and has a portion 21 extending down below the surface 17 of the glass 6 in the draw-pot 5. Obviously, with this member in use, due to the fact that it contacts with the lower edge of the lip-tile, the sheet 11 is shielded against the heat currents which ordinarily would contact with the same during the drawing operation. Furthermore, the sheet is drawn from glass under the surface so that the sheet can be drawn relatively faster than with the present type of cooler arrangements 22. If it is desired with the form of member 19 in use, the coolers 22 may be used if a quicker cooling action is wanted.

In the front lip-tile suitable openings 23 can be formed to permit the escape of gases and the like from between the lip-tile and the surface 17 of the molten glass, the openings being so arranged that they will send the gases off in a direction that will not interfere with the sheet 11. The size and arrangement of the openings 23 can be determined by the particular form of machine in which the refractory members 19 are used.

In use the members 19 are placed upon the pot 5 in such a manner that the lips 20 will rest upon the opposite sides of the pot to support the same in a position that the top surface of the member 19 will contact with the lower edge of the lip-tile 8. The portion 21 of the member 19 is adapted to be disposed a substantial distance below the surface 17 of the molten glass within the pot so that during the drawing action the glass will be drawn down under and around the lower extremity 21, thus giving a sheet that is formed largely from the glass under the surface.

It is to be understood that the form of the invention herewith shown and described is to be taken as the prefered embodiment of the same and that various changes in the shape, size and arrangement of parts may be resorted to without departing from the spirit of the invention or the scope of the subjoined claims.

Claims:

1. In a sheet glass drawing apparatus, including a draw-pot having a bath of molten glass therein, and a lip-tile arranged above the pot, a removable member interposed between the end of the lip-tile and the glass and extending below the surface of the glass, said member being adapted to be removed without interfering with said lip tile.

2. In a sheet glass drawing apparatus, including a draw-pot having a bath of molten glass therein, and a lip-tile arranged above the pot, a member supported on the opposite edges of the pot disposed between the end of the lip-tile and the glass, said member extending down into the glass.

3. In a sheet glass drawing apparatus, including a draw-pot having a bath of molten glass therein, and a lip-tile arranged above the pot, a member formed from refractory material supported upon opposite sides of the pot and contacting with the lower end of the lip-tile, said member having a portion extending below the surface of the molten bath.

4. In a sheet drawing apparatus, including a draw-pot having a bath of molten glass therein and a lip-tile arranged above the pot, means disposed between the lip-tile and molten bath to shield the sheet being drawn from hot air currents said means being removable without interference to said lip tile.

5. In a sheet drawing apparatus, including a draw-pot having a bath of molten glass therein, and a lip-tile arranged above the pot, means supported on opposite edges of the pot and disposed between the lip-tile and molten bath to shield the sheet being drawn from hot air currents present near the surface of the said molten bath.

6. In a sheet drawing apparatus, including a draw-pot having a bath of molten glass and a lip-tile arranged above the pot, means contacting with the lower end of the lip-tile and having a portion extending below the surface of the molten bath for shielding the sheet against hot air currents, said means being removable without interference to said lip tile.

7. In a sheet drawing apparatus, including a draw-pot having a bath of molten glass therein and a lip-tile arranged above the pot, a member formed from a refractory material supported on opposite sides of the pot and having a portion extending down below the surface of the glass to shield the sheet as it is being drawn.

8. In a sheet drawing apparatus, including a draw-pot having a bath of molten glass therein and a lip-tile arranged above the pot, a member contacting with the lip-tile and having a portion extending below the surface of the molten glass for causing the sheet to be drawn from glass below the surface of the molten bath and for shielding the sheet while it is being drawn, said means being removable without interference to said lip tile.

Signed at Lancaster, in the county of Fairfield, and State of Ohio, this 9th day of October, 1924.

NESTOR MAMBOURG.